L. COTE.
Apparatus for Trimming the Heels of Boots and Shoes.
No. 137,293.  Patented April 1, 1873.
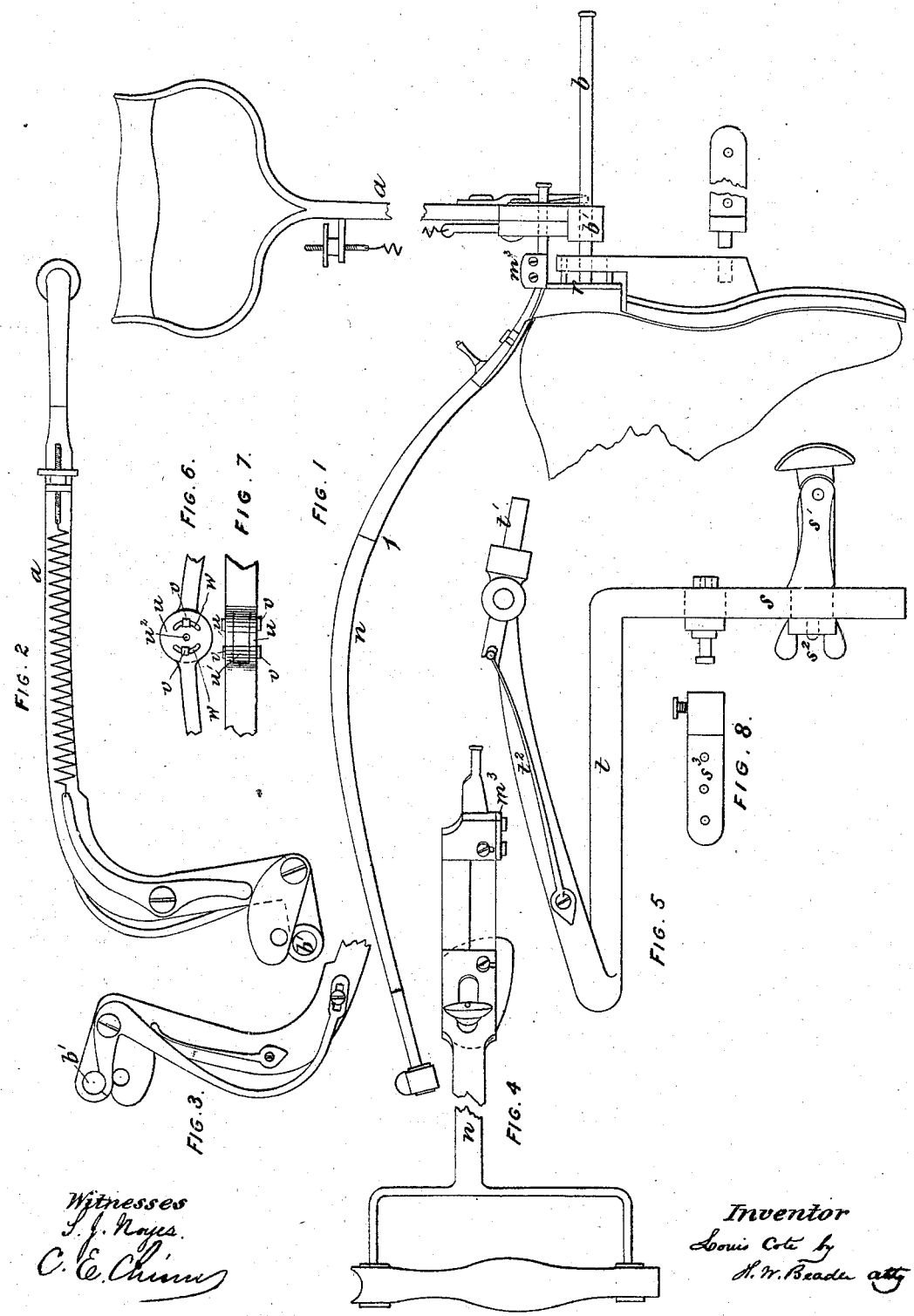

UNITED STATES PATENT OFFICE.

LOUIS COTÉ, OF ST. HYACINTHE, CANADA.

IMPROVEMENT IN APPARATUS FOR TRIMMING THE HEELS OF BOOTS AND SHOES.

Specification forming part of Letters Patent No. 137,293, dated April 1, 1873; application filed March 6, 1872.

*To all whom it may concern:*

Be it known that I, LOUIS COTÉ, of the City of St. Hyacinthe, in the district of St. Hyacinthe, in the Province of Quebec, Canada, have invented new and useful Improvements on the Apparatus for Trimming the Heels of Boots and Shoes, and for retaining them in position during the operation; and I do hereby declare that the following is a full, clear, and exact description of the construction and operation of the same, reference being had to the annexed drawing, where—

Figure 1 represents a side elevation of the trimming apparatus. Fig. 2 represents a front elevation of the trimming apparatus. Fig. 3 represents a part back elevation of the trimming apparatus. Fig. 4 represents a plan of knife-carrier lever. Fig. 5 represents a modification of the jack used in combination with the trimmer when "stoga" boots are operated upon. Fig. 6 represents details of modification of knife-carrier. Fig. 7 represents a side elevation of the parts represented in Fig. 6; and Fig. 8 represents the pivot-plate, by means of which the compressing-arms are connected to the tool.

This invention has reference to further improvements on the apparatus already invented by me, and for which Letters Patent of the United States, No. 104,560, bearing date the 21st of June, 1870, and No. 109,300, dated November 13, 1870, have already been granted to me, the purpose of these improvements being to adapt it for more general use, and give greater facility in operating it.

In the drawing, similar letters of reference indicate like parts.

Letter $a$ is the lever, the eye $b'$ of which fits on the pin $b$, made in this case of such length as to allow the whole trimming apparatus, when not in use, to be moved back, and hang down clear of the shoe-holding machine used in combination with it, thus saving time, and being far more convenient for the workman, than having to pick up the apparatus and adjust it at each heel cut. The lever $a$ and knife-carrier $n$ are in all respects similar to those for which I have already obtained Letters Patent, with the exception that at the point 1, in Fig. 1, a joint is formed, an elevation and plan of the exact construction of which are shown in Fig. 6, one end being provided with a double eye, $u$, and the other with a corresponding single eye, $u^1$, with a pivot, $u^2$, connecting them together. $w$ are slots cut correspondingly through $u$ and $u^1$, in which are placed bolts $v$. By this means the end of $n$, having the handle $l$ attached, can be set in various positions, to adapt it to more convenient use. To the knife end of the carrier $n$, and as shown in Figs. 1 and 4, is secured a metal guide, $m^3$, to slide on the plate $r$, acting as a guide for the knife on the lower edge of the heel; and if desired for adjustment, the holes of the screws by which it is attached may be slotted vertically. The plate $s$, having, as in the before-patented invention, the knuckle-joint $s^1$, secured by the nut $s^2$, and being itself attached to the holding apparatus by the movable pivot $s^3$, has its upper extremity terminated in a long elbow, $t$, of the configuration shown, and having pivoted to it the pin $t^1$, acted upon in this case by a bow-spring, $t^2$. This is for the purpose of giving the room required for the legs of stoga boots, and to enable them to be held securely while being operated upon by the trimming apparatus.

Having thus described the construction and operation of my invention, I claim as follows:

1. The knife-carrier $n$, constructed with joint at 1, substantially as described.

2. The plate $s$, in combination with the elbow $t$, pin $t^1$, and spring $t^2$, substantially as and for the purposes described.

Montreal, 28th day of February, A. D. 1872.

LOUIS COTÉ.

Signed in the presence of—
    JOS. A. LAFERRIÈRE,
    BTE. FRÉDÉRIC.